(12) United States Patent
Carter et al.

(10) Patent No.: US 9,004,292 B2
(45) Date of Patent: *Apr. 14, 2015

(54) SQUEEZABLE BEVERAGE BOTTLE AND FILTER SYSTEM

(75) Inventors: Randy E. Carter, Waynesfield, OH (US); Brian D. Schumacher, Lima, OH (US); Edward A. Kidston, Pioneer, OH (US); Karim Rashid, New York, NY (US); Richard Smiedt, New York, NY (US)

(73) Assignee: Seventh Generation Ventures, Inc., Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/578,611

(22) PCT Filed: Feb. 11, 2011

(86) PCT No.: PCT/US2011/024608
§ 371 (c)(1),
(2), (4) Date: Nov. 7, 2012

(87) PCT Pub. No.: WO2011/100597
PCT Pub. Date: Aug. 18, 2011

(65) Prior Publication Data
US 2013/0199989 A1    Aug. 8, 2013

Related U.S. Application Data

(63) Continuation-in-part of application No. 12/854,721, filed on Aug. 11, 2010, now abandoned.

(60) Provisional application No. 61/304,216, filed on Feb. 12, 2010.

(51) Int. Cl.
*B01D 24/38* (2006.01)
*B01D 24/00* (2006.01)
(Continued)

(52) U.S. Cl.
CPC ............ *A47G 19/2266* (2013.01); *C02F 1/002* (2013.01); *C02F 1/283* (2013.01); *C02F 2201/006* (2013.01); *C02F 2307/02* (2013.01)

(58) Field of Classification Search
None
See application file for complete search history.

(56) References Cited

U.S. PATENT DOCUMENTS 703,654 A    7/1902   Hall
1,019,171 A  3/1912   Melville-Hamilton
(Continued)

FOREIGN PATENT DOCUMENTS

JP          3017534        10/1995

OTHER PUBLICATIONS

Packaging Consultant; "Polyethylene Terephthlate [sic] (PET) Water Bottles"; Feb. 15, 2008; First Paragraph.*
(Continued)

*Primary Examiner* — Nam Nguyen
*Assistant Examiner* — Richard Gurtowski
(74) *Attorney, Agent, or Firm* — Dunkiel Saunders Elliott Raubvogel & Hand PLLC; Justin W. McCabe

(57) ABSTRACT

Embodiments of the present disclosure could generally provide a relatively easily squeezable beverage bottle that allows control of the flow rate of the liquid being dispensed to the user. The bottle could provide sufficient radial rigidity—or resistance to squeezing—to return to its original shape (or "bounce back") at a suitable rate without experiencing permanent deformation or denting and to withstand the rigors of filling, shipping, transporting, dispensing, etc. The present disclosure generally provides a beverage bottle filtering system that provides adequate filtering of water taken from the bottle at a suitable rate. In one embodiment, the present disclosure could include a support system to adequately secure the filter media within a filter housing while ensuring a sufficient compression fit and seal of filter media within filter system to eliminate "bypass flow" (i.e., water that might leak past filter system) and prevent consumption of unfiltered water.

20 Claims, 14 Drawing Sheets

(51) Int. Cl.
*B01D 27/00* (2006.01)
*A47G 19/22* (2006.01)
*C02F 1/00* (2006.01)
*C02F 1/28* (2006.01)

(56) References Cited

U.S. PATENT DOCUMENTS

| | | | |
|---|---|---|---|
| 3,950,251 | A | 4/1976 | Hiller |
| 4,605,499 | A | 8/1986 | Wise |
| 4,766,019 | A * | 8/1988 | Michaels et al. ............. 428/36.6 |
| 4,859,386 | A | 8/1989 | VanderBilt et al. |
| 4,976,364 | A | 12/1990 | Solomon |
| 5,106,501 | A | 4/1992 | Yang et al. |
| 5,273,650 | A | 12/1993 | Vermes |
| 5,401,399 | A | 3/1995 | Magnusson |
| 5,545,315 | A | 8/1996 | Lonneman |
| 5,609,759 | A | 3/1997 | Nohren, Jr. et al. |
| 5,653,878 | A | 8/1997 | Reid |
| 5,840,185 | A | 11/1998 | Hughes et al. |
| 5,919,365 | A | 7/1999 | Collette |
| 5,928,512 | A | 7/1999 | Hatch et al. |
| 6,117,319 | A | 9/2000 | Cranshaw |
| 6,136,189 | A | 10/2000 | Smith et al. |
| 6,153,096 | A | 11/2000 | Nonren, Jr. |
| 6,193,886 | B1 | 2/2001 | Nohren, Jr. |
| 6,200,471 | B1 | 3/2001 | Nohren, Jr. |
| 6,395,170 | B1 | 5/2002 | Hughes |
| 6,506,449 | B2 | 1/2003 | Mierau et al. |
| 6,569,329 | B1 | 5/2003 | Nohren, Jr. |
| 6,602,406 | B1 | 8/2003 | Nohren et al. |
| 7,473,362 | B1 | 1/2009 | Nohren, Jr. |
| 2004/0164047 | A1* | 8/2004 | White ........................ 215/384 |
| 2008/0237924 | A1 | 10/2008 | Bassett et al. |
| 2009/0145839 | A1 | 6/2009 | Miga, Jr. |

OTHER PUBLICATIONS

Al-Motin, Abdulla, Innovation Patent Examination Report No. 3 for Australian Innovation Patent No. 2012100478, dated Sep. 9, 2014, IP Australia.
Response to Innovation Patent Examination Report No. 3 for Australian Innovation Patent No. 2012100478, dated Sep. 18, 2014.
Innovation Patent Certification for Australian Innovation Patent No. 2012100478, dated Sep. 24, 2014, IP Australia.
Response to Canadian Office Action for Canadian Application No. 2,801,642 dated Jul. 31, 2014.
Response to First Examination Report for Australian Patent Application No. 2011215628 dated Sep. 18, 2014.
Zhao Peixun, Second Office Action for Chinese patent application No. 201180009137.8 dated Sep. 1, 2014.
Al-Motin, Abdulla, Patent Examination Report No. 2 for Australian Patent Application No. 2011215628, dated Oct. 21, 2014, IP Australia.
Response to Supplementary European Search Report for European Application No. EP 11742903, Oct. 29, 2014.
Al-Motin Abdulla, Innovation Patent Examination Report No. 2 for Australian Innovation Patent No. 2012100478, dated May 5, 2014, IP Australia.
Response to Innovation Patent Examination Report No. 2 for Australian Innovation Patent No. 2012100478, dated Jul. 24, 2014.
U.S. Patent 6,653,096, Response to Office Action in Ex Parte Reexamination 90/012,452, Jul. 30, 2013.
Lopez, Carlos N., Non-Final Action in Ex Parte Reexamination 90/012,452, Feb. 19, 2014.
Lopez, Carlos N., Reexam Petition Decision Grant-in-part—in Ex Parte Reexamination 90/012,452, Jun. 14, 2013.
U.S. Patent 5,609,759, Response to Office Action in Ex Parte Reexamination 90/012,453, Feb. 27, 2014.
Lopez, Carlos N., Final Action in Ex Parte Reexamination 90/012,453, May 29, 2014.
Gurtowski, Richard C., Office Action for U.S. Appl. No. 12/854,721, Jan. 1, 2014.
Liebig, Thomas, Supplementary European Search Report for European Application No. EP 11742903, Apr. 9, 2014.
Al-Motin, Abdulla, Innovation Patent Examination Report No. 2 for Australian Innovation Patent No. 2012100478, May 5, 2014.
Lopez, Carlos N., Office Action in Ex Parte Reexamination 90/012,453, Apr. 17, 2013.
Lopez, Carlos N., Order Granting in Ex Parte Reexamination 90/012,452, Nov. 16, 2012.
Lopez, Carlos N., Office Action in Ex Parte Reexamination 90/012,452, Apr. 30, 2013.
Gurtowski, Richard C., Office Action for U.S. Appl. No. 12/854,721, Aug. 17, 2012.
Gurtowski, Richard C., Office Action for U.S. Appl. No. 12/854,721, Jan. 17, 2013.
Lee W. Young, PCT Notification of Transmittal of the International Search Report and the Written Opinion of the International Searching Authority, or the Declaration, International Application No. PCT/US11/24608, Jul. 1, 2011, 14 pages.
Wenas, Milka, AU Patent No. 2010100917, Examiner's First Report, 3178MOV/WGB/mcr, dated Mar. 23, 21012, 2 pages.
Al-Motin, Abdulla, AU Patent No. 2010100917, Examiner's Second Report, 3178MOV/WGB/mcr, dated May 23, 2012, 2 pages.
Al-Motin, Abdulla, AU Patent No. 2010100917, Examiner's Third Report, 3178/MOV/WBG/mcr, dated Jun. 13, 2012, 4 pages.
Lopez, U.S. Appl. No. 90/012,453, Patent No. 5,609,759, Ex Parte Reexamination Communication, Oct. 15, 2012, 14 pages.
Notice of Allowance of Canadian Application No. 2801642, dated Nov. 12, 2014.

* cited by examiner

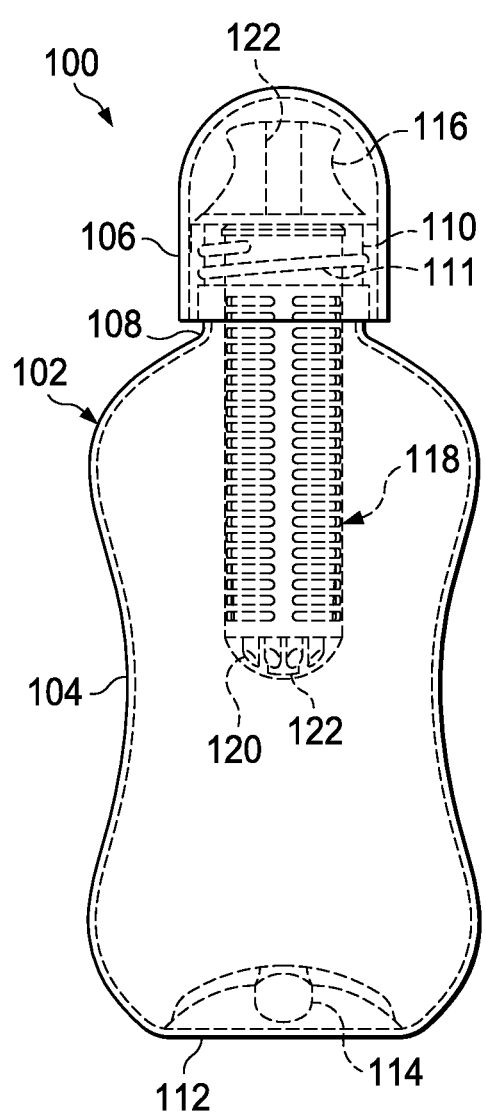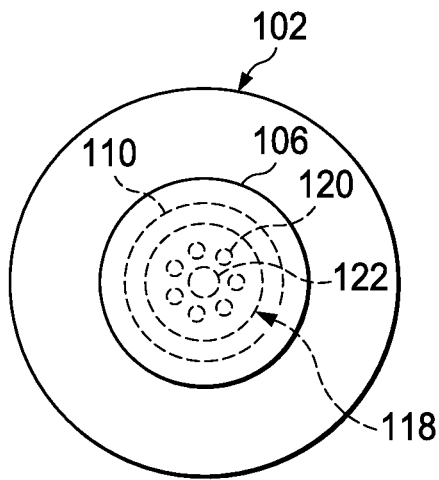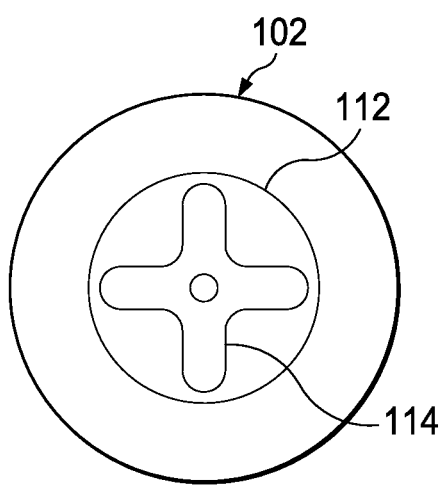
FIG. 2A
FIG. 2B
FIG. 2C

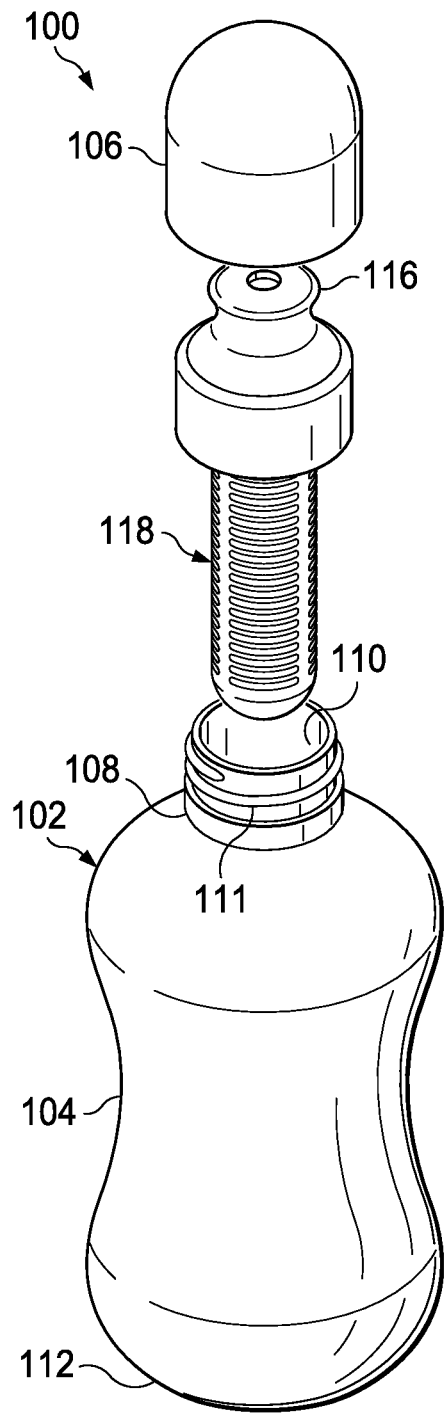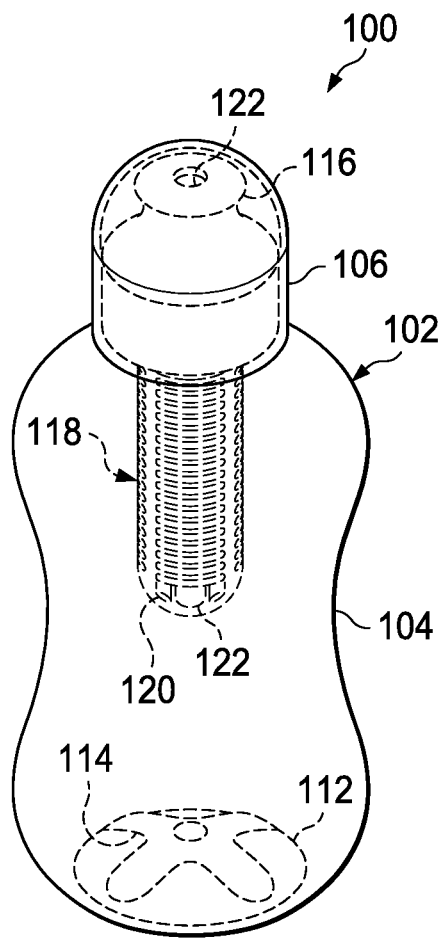
FIG. 3A
FIG. 3B

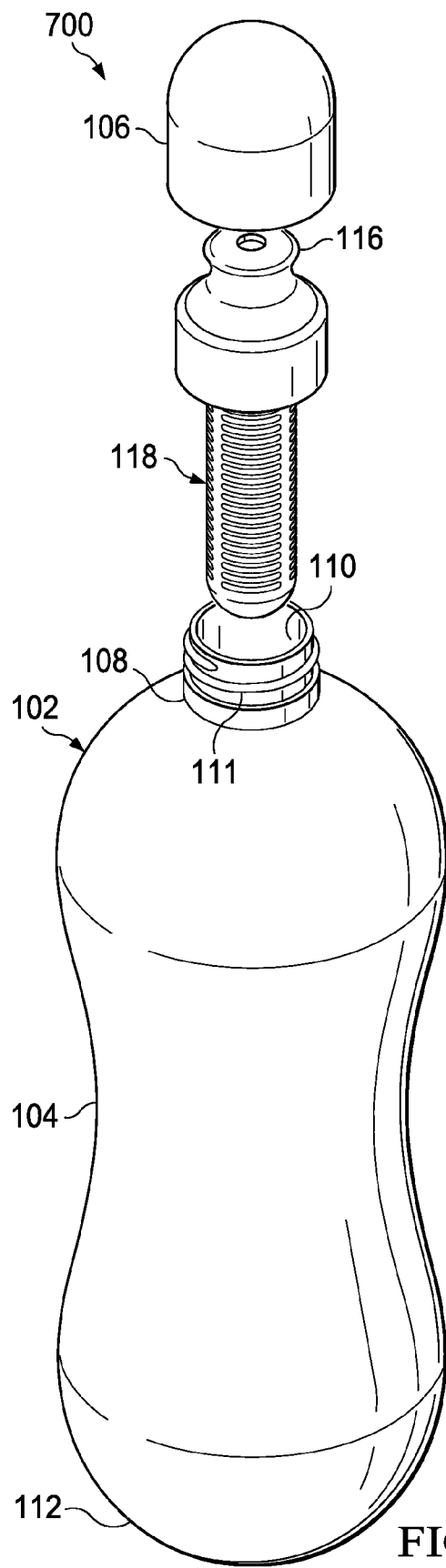
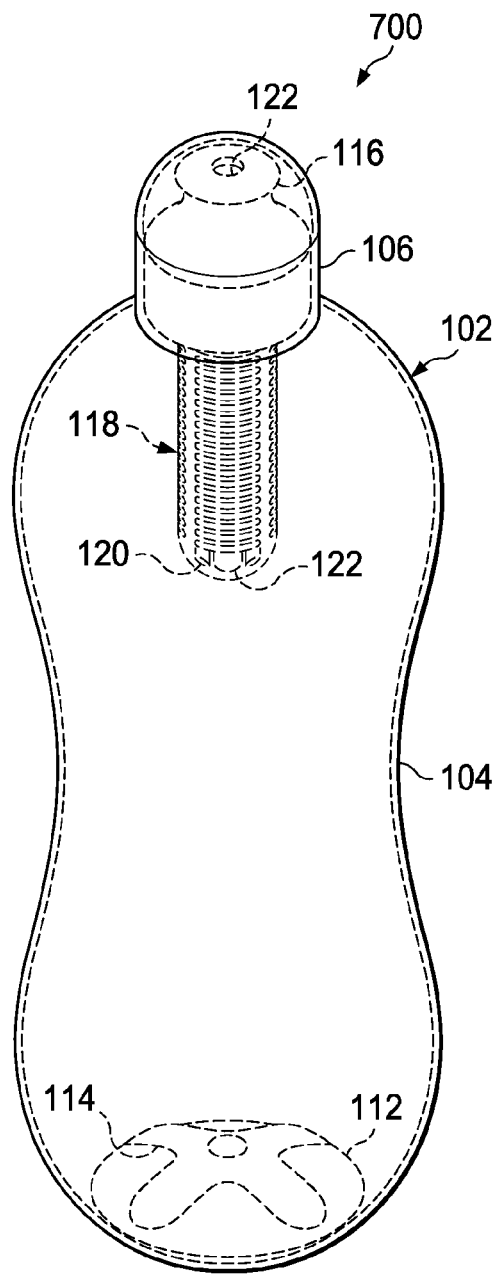
FIG. 9A
FIG. 9B

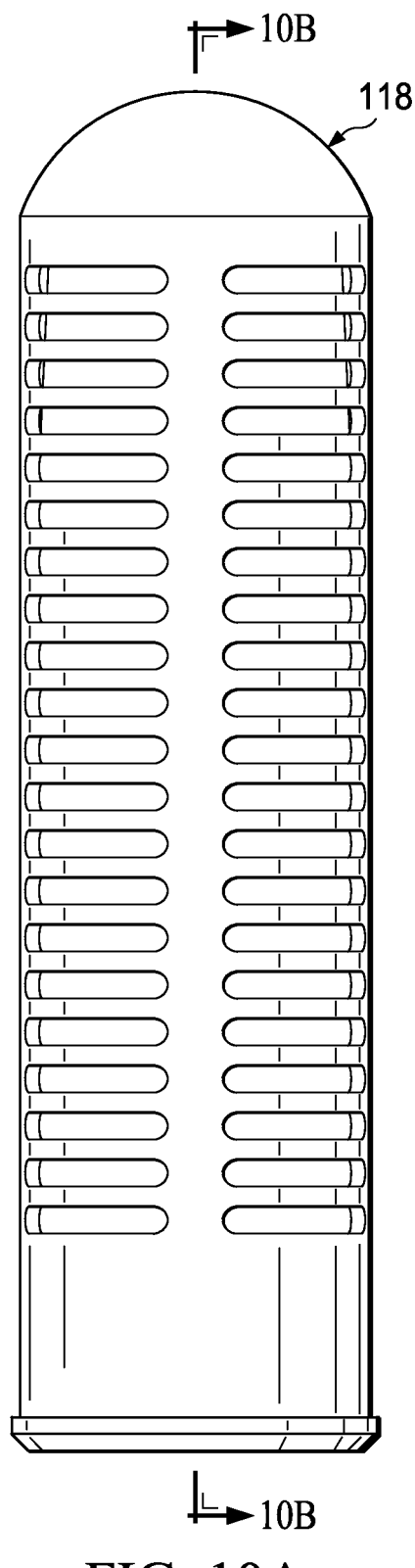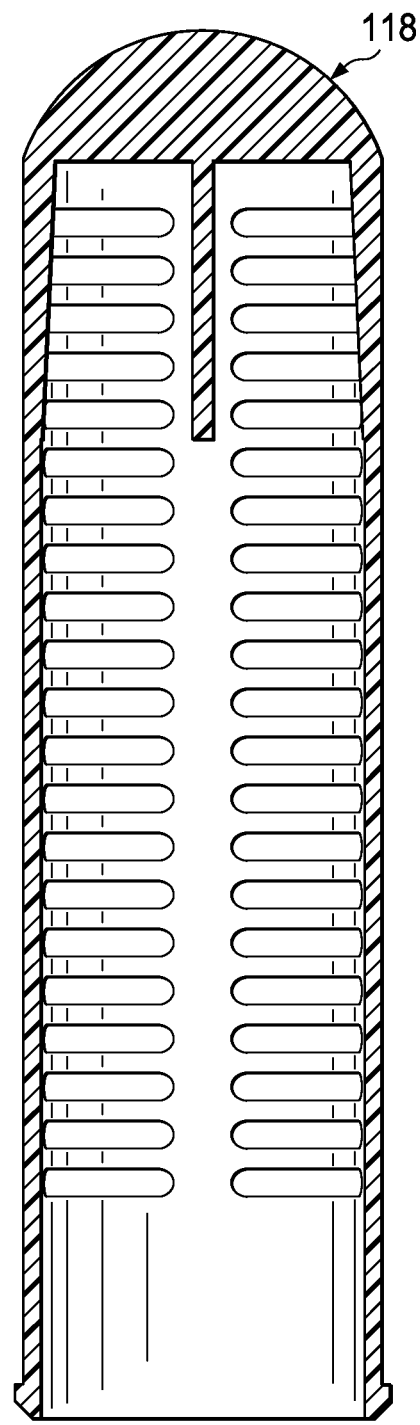
FIG. 10A
FIG. 10B

SQUEEZABLE BEVERAGE BOTTLE AND FILTER SYSTEM

TECHNICAL FIELD

The present disclosure relates generally to containers and, in particular, to squeezable beverage bottles. The present disclosure further relates generally to filtering systems for beverage bottles.

BACKGROUND

Conventional portable water bottles are typically used to provide a thirst-quenching liquid to a person. Such bottles often include a plastic container having a removable lid, cover, cap, or other structure secured to an opening of the container to close off the container. Water could be obtained from the container for drinking by squeezing the container and forcing the water through the opening. Such containers lack sufficient elasticity to return to their original shape (or "bounce back") at a suitable rate and without experiencing permanent deformation or denting. Such containers ultimately further deform and degrade after repeated attempts to squeeze such containers.

Conventional portable water bottles typically require the user to proactively inhale air from and suck on an opening of the bottle to facilitate a sufficient flow to force water through the opening of the bottle. Such bottles require the user to proactively use force on an opening of the bottle to facilitate water discharge.

An object of one embodiment of the present disclosure is to provide a relatively inexpensive squeezable beverage bottle that is relatively easy to squeeze, provides a desirable flow rate, and exhibits sufficient radial rigidity to resist damage and/or undesired deformation even after repeated handling and squeezing. Another object of the present disclosure is to provide a squeezable beverage bottle used as part of a bottle mountable filtration system.

Further, there is no guarantee on the integrity or degree of filtering for water obtained from conventional portable water bottles. Conventional filter media materials such as, for example, carbon filters, easily break apart and require special handling. Conventional manufacturing methods for filtering systems often times result in wasted filter media material.

Therefore, an object of one embodiment of the present disclosure is to provide a relatively inexpensive filter system for a beverage bottle that provides an acceptable degree of filtering of water transported in the bottle and provides a desirable flow rate. Another object of the present disclosure is to provide an easy to manufacture and cost-effective bottle mountable filtration system.

SUMMARY

Embodiments of the present disclosure generally provide a squeezable beverage bottle exhibiting one or more of several desirable characteristics.

In one embodiment, the present disclosure could provide a relatively easily squeezable beverage bottle that allows control of the flow rate of the liquid being dispensed to the user while providing sufficient radial rigidity or resistance to squeezing—to return to its original shape (or "bounce back") at a suitable rate without experiencing permanent deformation or denting and to withstand the rigors of filling, shipping, transporting, dispensing, repeated squeezes, and subsequent uses.

In one embodiment, the present disclosure could provide a squeezable beverage bottle used as part of a bottle mountable filtration system. The present disclosure could control the flow rate of liquid discharged from a beverage bottle and through the bottle mountable filtration system for the liquid contained in the beverage bottle.

In one embodiment, the present disclosure could provide a bottle including an elastic quality that aids in retaining its shape for aesthetic and functional reasons (e.g., to sit upright or to facilitate future flow of water).

In one embodiment, the present disclosure could provide a relatively inexpensive disposable bottle or, alternatively, a reusable bottle for transporting water or other liquids to thus provide an environmentally friendly option to conventional bottles.

Embodiments of the present disclosure could provide a bottle mountable filtration system that delivers an acceptable level of filtration of water transported in the bottle.

In one embodiment, the present disclosure could provide a bottle filter system. The system could include a filter media having a first end disposed along the proximate end of a filter housing and a second end disposed along the distal end of the filter housing. The filter could also include a support structure disposed along an interior surface of the proximate end of the filter housing. The support structure could compress the first end of the filter media to prevent water housed in the bottle from bypassing the compressed seal between the support structure and the filter media.

In one embodiment, the present disclosure could provide a bottle filter system. The system could include a filter housing removably mounted within a bottle having a proximate end and a distal end. The system could also include a filter media comprising a first end and a second end. The first end could be disposed along the proximate end of the filter housing and the second end could be disposed along the distal end of the filter housing. The system could also include a support structure disposed along an interior surface of the proximate end of the filter housing. The support structure could be further disposed along a bottom surface of a discharge mechanism of the bottle. The support structure could be configured to cut into the first end of the filter media when the filter media is in an engaged position within the filter housing. The system could also include a secondary support structure disposed along an interior surface of the distal end of the filter housing. The secondary support structure could be configured to cut into the second end of the filter media when the filter media is in an engaged position within the filter housing.

In one embodiment, the present disclosure could provide a bottle filter system. The system could include a filter housing removably mounted within a bottle having a proximate end and a distal end. The system could also include a carbon-based filter media comprising a first end and a second end. The first end could be disposed along the proximate end of the filter housing and the second end could be disposed along the distal end of the filter housing. The system could also include an annular support structure disposed along an interior surface of the proximate end of the filter housing and further disposed along a bottom surface of a discharge mechanism of the bottle. The support structure could be configured to cut into the first end of the filter media when the filter media is in an engaged position within the filter housing. The system could also include a crossbar-like secondary support structure disposed along an interior surface of the distal end of the filter housing. The secondary support structure could be configured to cut into the second end of the filter media when the filter media is in an engaged position within the filter housing.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 2A is a somewhat simplified side plan view of a relatively small reusable squeezable beverage bottle fitted with a filter according to one embodiment of the present disclosure;

FIG. 2B is a somewhat simplified top plan view of the bottle and filter shown in FIG. 2A according to one embodiment of the present disclosure;

FIG. 2C is a somewhat simplified bottom plan view of the bottle and filter shown in FIG. 2A according to one embodiment of the present disclosure;

FIG. 3A is a somewhat simplified exploded perspective view of the bottle and filter shown in FIG. 2A according to one embodiment of the present disclosure;

FIG. 3B is a somewhat simplified perspective view of the bottle shown in FIG. 3A with the filter in an installed position according to one embodiment of the present disclosure;

FIG. 9A is a somewhat simplified exploded perspective view of the bottle and filter shown in FIG. 8A according to one embodiment of the present disclosure;

FIG. 9B is a somewhat simplified perspective view of the bottle shown in FIG. 9A with the filter in an installed position according to one embodiment of the present disclosure;

FIG. 10A is a somewhat simplified side plan view of a filter system according to one embodiment of the present disclosure;

FIG. 10B is a somewhat simplified view along section 10B-10B of the filter system shown in FIG. 10A according to one embodiment of the present disclosure;

DETAILED DESCRIPTION

Figure 1A:
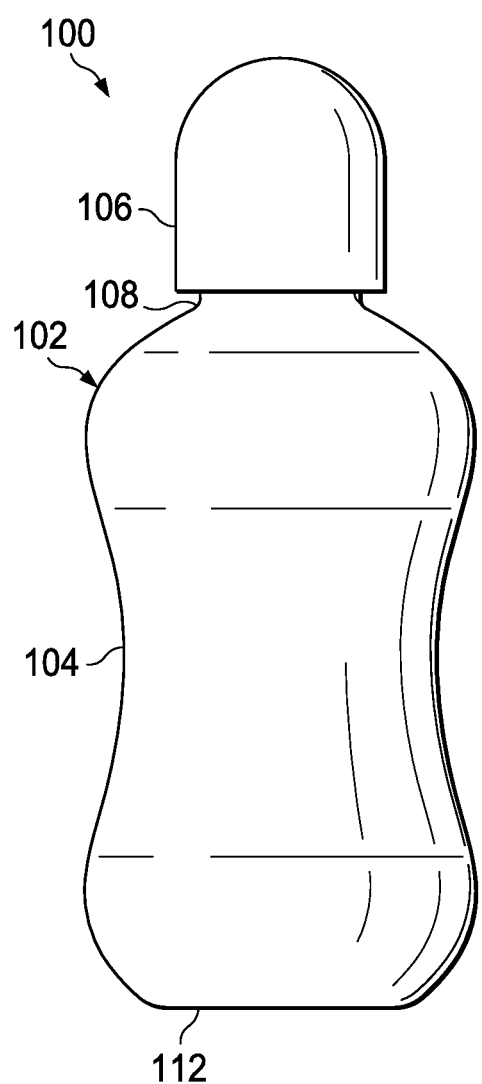
FIG. 1A is a somewhat simplified side plan view of a relatively small reusable squeezable beverage bottle according to one embodiment of the present disclosure.
Figure 1B:
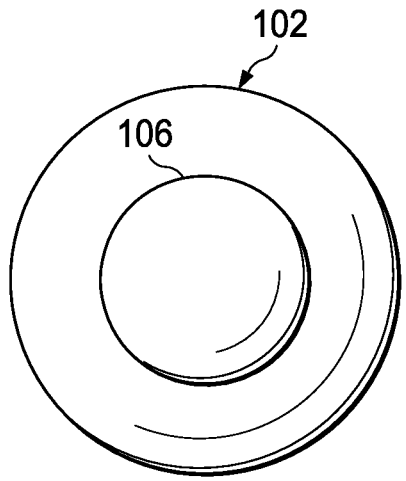
FIG. 1B is a somewhat simplified top plan view of the bottle shown in FIG. 1A according to one embodiment of the present disclosure.
Figure 1C:
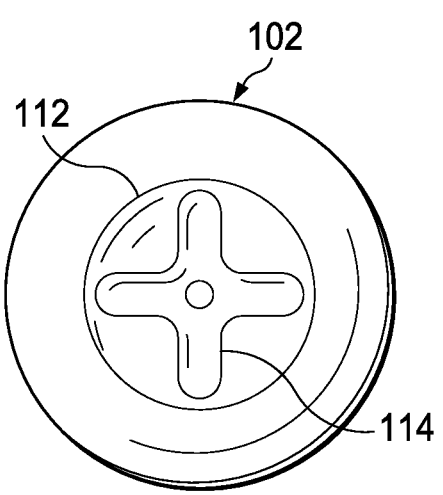
FIG. 1C is a somewhat simplified bottom plan view of the bottle shown in FIG. 1A according to one embodiment of the present disclosure.
Figure 4A:
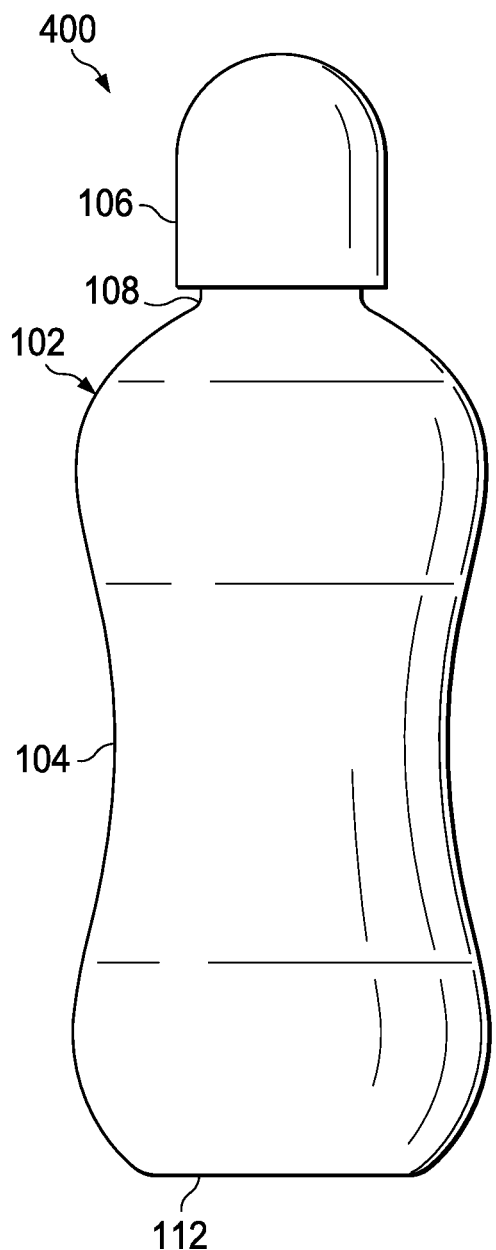
FIG. 4A is a somewhat simplified side plan view of a relatively medium-sized reusable squeezable beverage bottle according to one embodiment of the present disclosure.
Figure 4B:
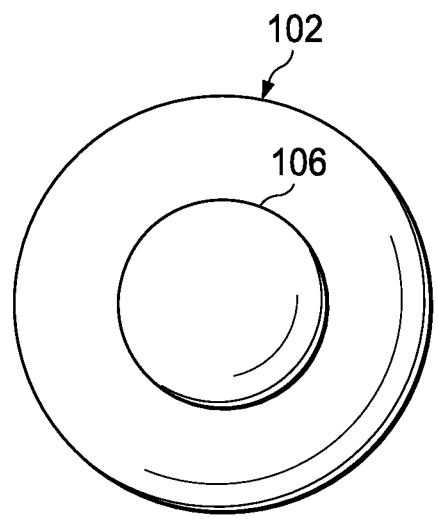
FIG. 4B is a somewhat simplified top plan view of the bottle shown in FIG. 4A according to one embodiment of the present disclosure.
Figure 4C:
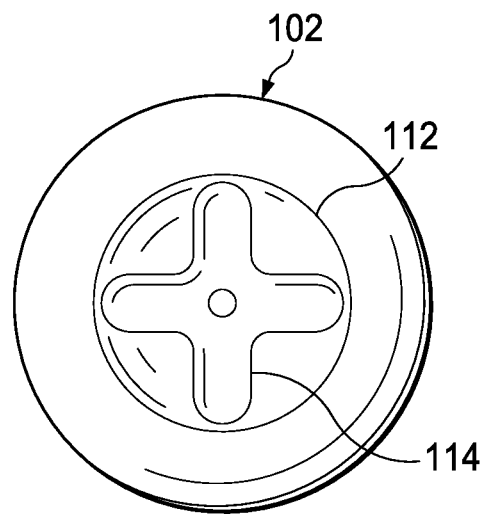
FIG. 4C is a somewhat simplified bottom plan view of the bottle shown in FIG. 4A according to one embodiment of the present disclosure.
Figure 5A:
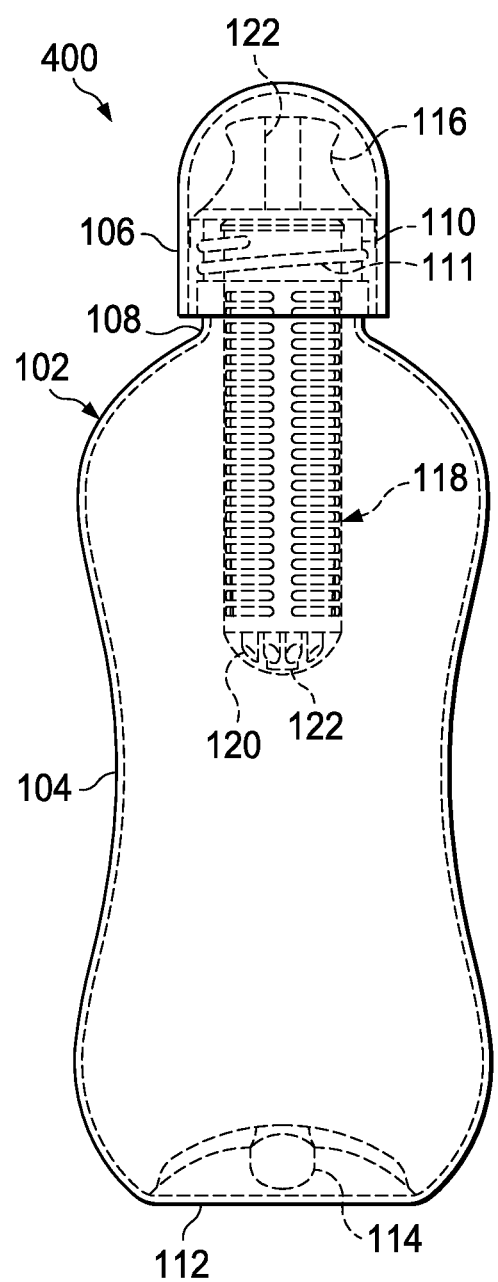
FIG. 5A is a somewhat simplified side plan view of a relatively medium-sized reusable squeezable beverage bottle fitted with a filter according to one embodiment of the present disclosure.
Figure 5B:
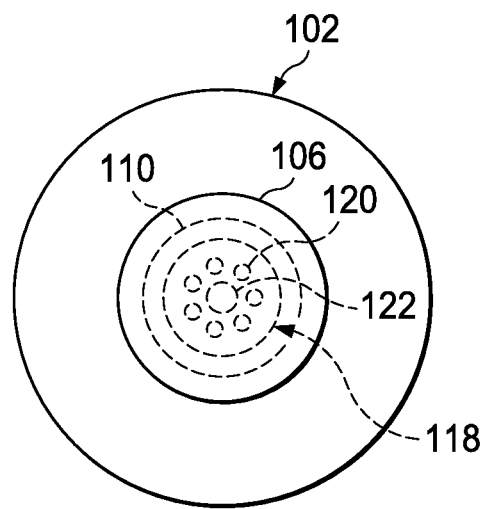
FIG. 5B is a somewhat simplified top plan view of the bottle and filter shown in FIG. 5A according to one embodiment of the present disclosure.
Figure 5C:
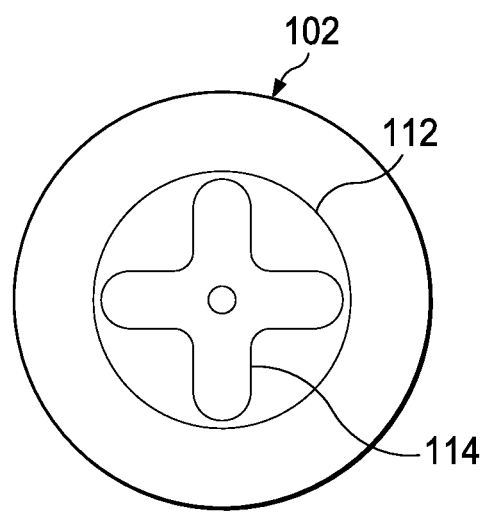
FIG. 5C is a somewhat simplified bottom plan view of the bottle and filter shown in FIG. 5A according to one embodiment of the present disclosure.
Figure 6A:
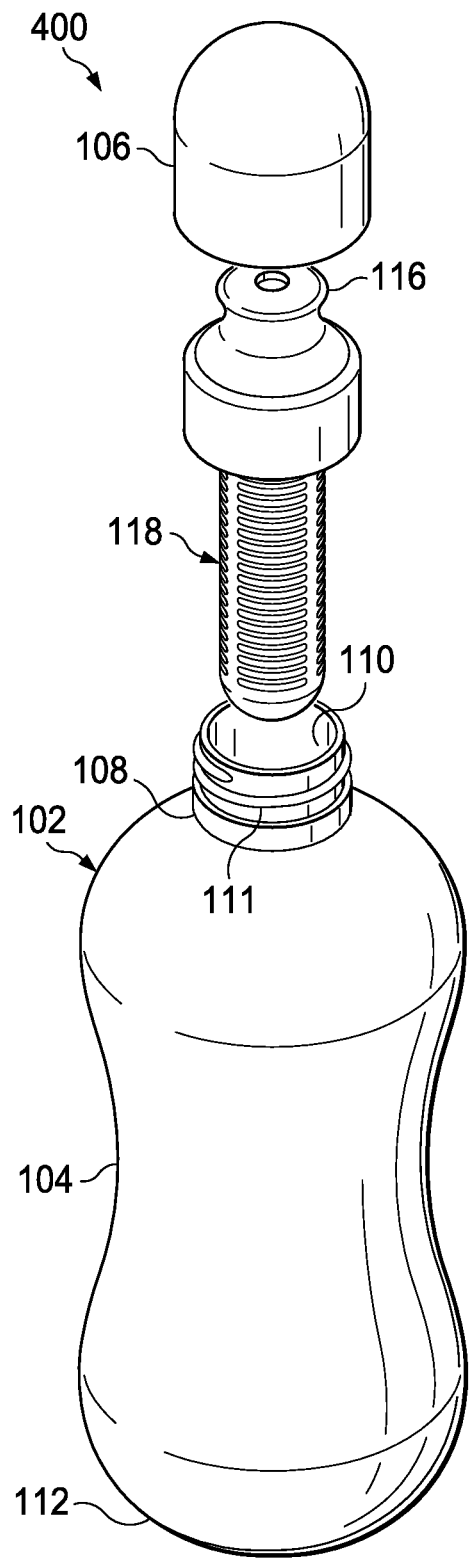
FIG. 6A is a somewhat simplified exploded perspective view of the bottle and filter shown in FIG. 5A according to one embodiment of the present disclosure.
Figure 6B:
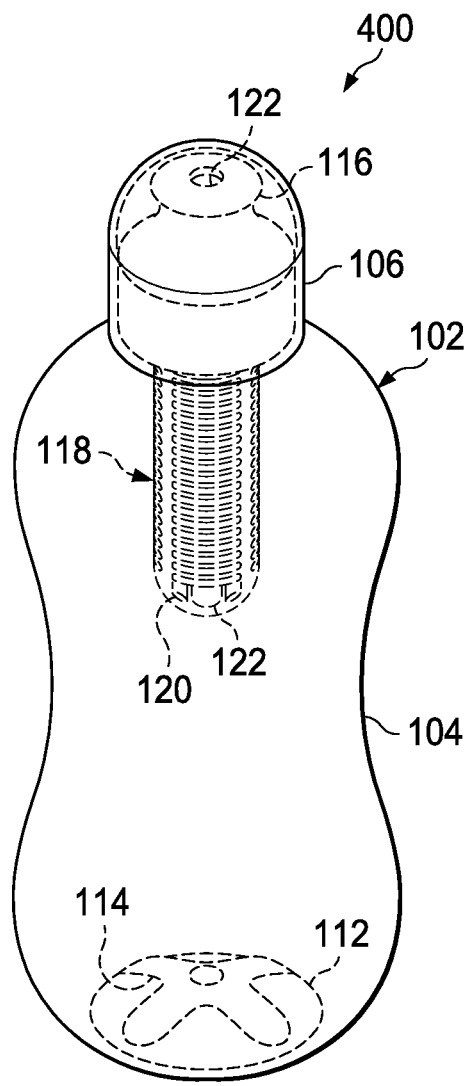
FIG. 6B is a somewhat simplified perspective view of the bottle shown in FIG. 6A with the filter in an installed position according to one embodiment of the present disclosure.
Figure 7A:
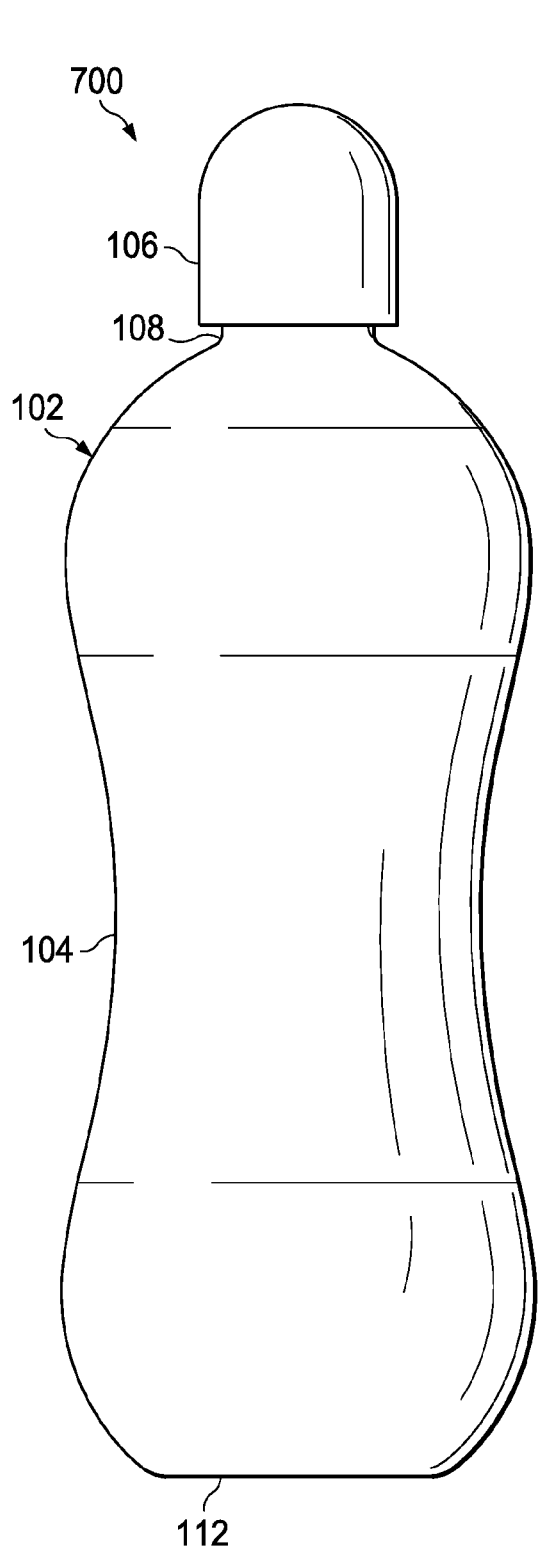
FIG. 7A is a somewhat simplified side plan view of a relatively large-sized reusable squeezable beverage bottle according to one embodiment of the present disclosure.
Figure 7B:
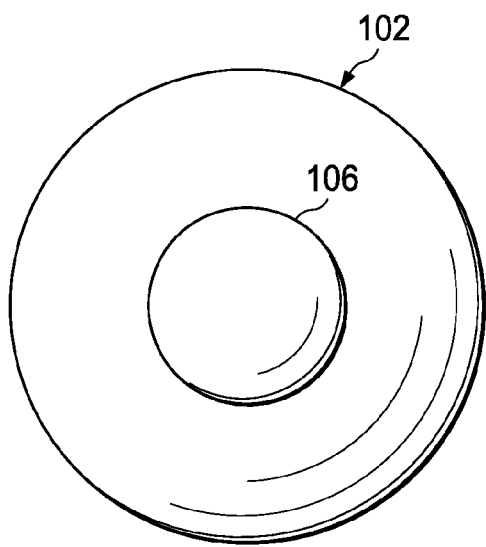
FIG. 7B is a somewhat simplified top plan view of the bottle shown in FIG. 7A according to one embodiment of the present disclosure.
Figure 7C:
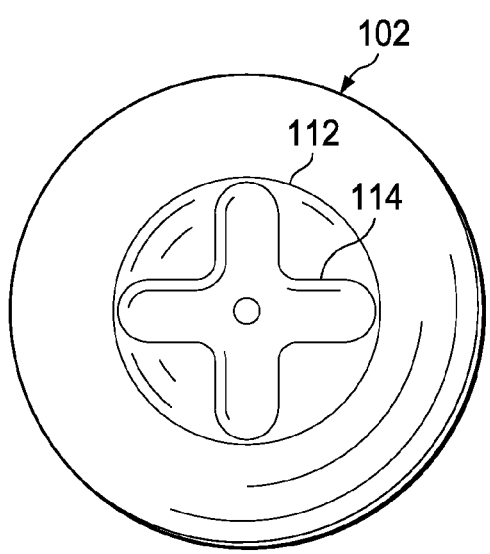
FIG. 7C is a somewhat simplified bottom plan view of the bottle shown in FIG. 7A according to one embodiment of the present disclosure.
Figure 8A:
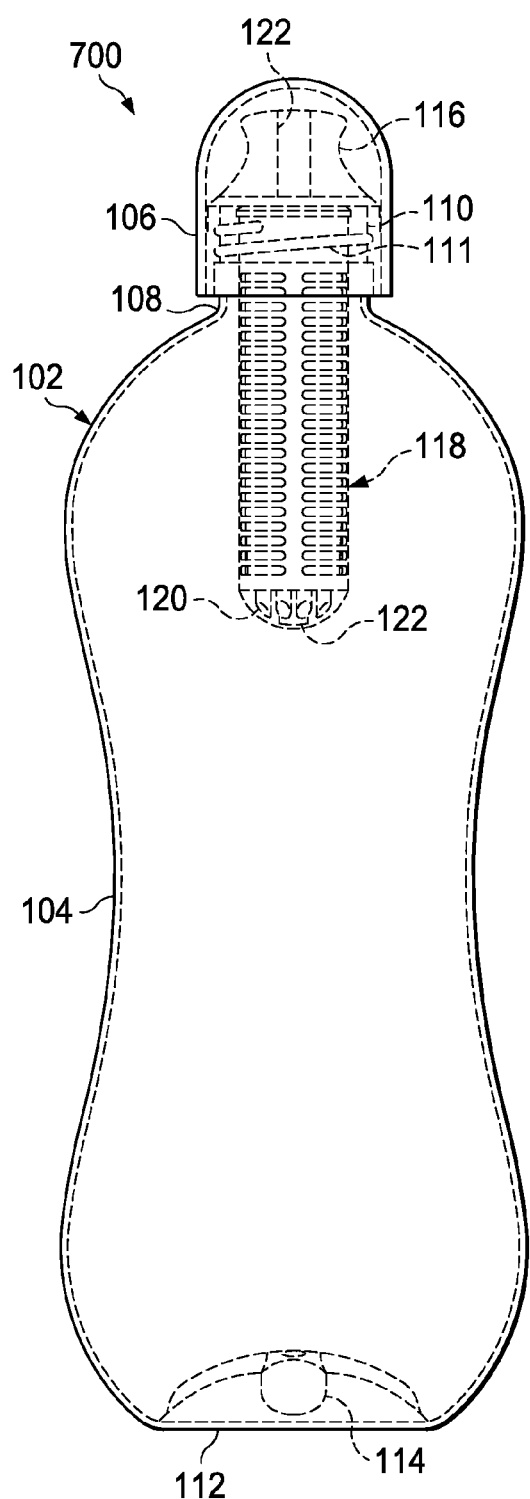
FIG. 8A is a somewhat simplified side plan view of a relatively large-sized reusable squeezable beverage bottle fitted with a filter according to one embodiment of the present disclosure.
Figure 8B:
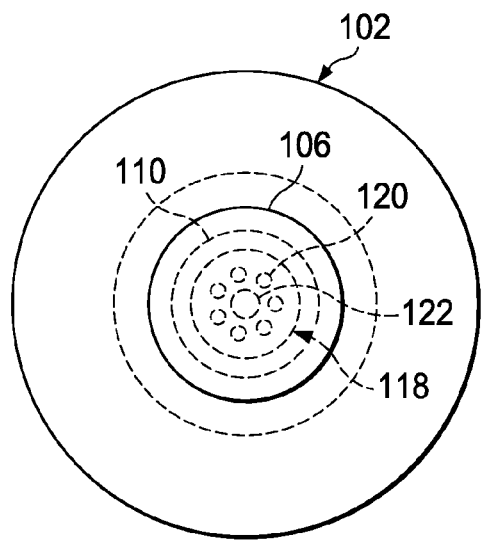
FIG. 8B is a somewhat simplified top plan view of the bottle and filter shown in FIG. 8A according to one embodiment of the present disclosure.
Figure 8C:
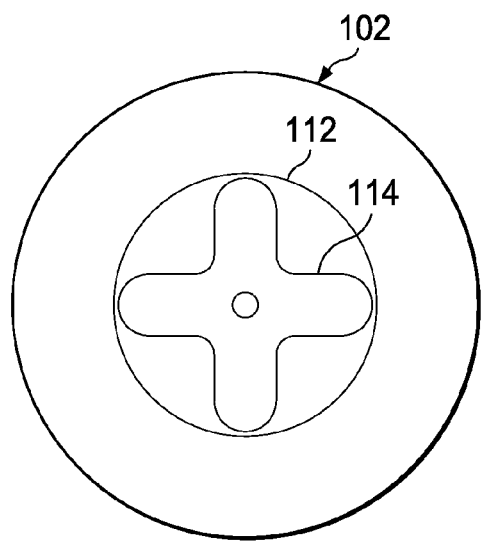
FIG. 8C is a somewhat simplified bottom plan view of the bottle and filter shown in FIG. 8A according to one embodiment of the present disclosure.

The present disclosure generally provides a beverage bottle that, while being squeezable, also has sufficient rigidity and elasticity to return to its original shape (or "bounce back") at a suitable rate without experiencing permanent deformation or denting. In one embodiment, the present disclosure could provide a squeezable beverage bottle used as part of a bottle mountable filtration system. As an example, the present disclosure could be particularly suitable for use in a bottle mountable filtration system such as those disclosed in U.S. Pat. Nos. 6,569,329 and 5,609,759.

In another aspect, the present disclosure generally provides a relatively inexpensive filtration system for disposable bottles or, alternatively, reusable bottles for transporting water or other liquids to thus provide an environmentally friendly option to conventional bottled water systems. In one embodiment, the present disclosure could include a support system to adequately secure the filter media within a filter housing while ensuring a sufficient compression fit and seal of filter media within filter system to eliminate "bypass flow" (i.e., water that might leak past filter system) and prevent consumption of unfiltered water.

In one embodiment, the present disclosure could be particularly suitable for use in a bottle mountable filtration system such as those disclosed in U.S. Pat. Nos. 6,569,329 and 5,609,759. Although the following description generally describes a filter system for use with a "squeezable" bottle, it should be understood that embodiments of the filter system of the present disclosure could be used with any suitably sized, shaped, or configured bottle, container, or container-like receptacle including, for example, rigid bottles and containers that are not squeezable. FIGS. 1A-2C are somewhat simplified plan views of a relatively small reusable squeezable beverage bottle 100 according to one embodiment of the present disclosure. FIG. 3A is a somewhat simplified exploded perspective view of bottle 100, while FIG. 3B is a somewhat simplified perspective view of bottle 100 according to one embodiment of the present disclosure. It should be understood that bottle 100 shown in FIGS. 1A-3B are for illustrative purposes only and that any other bottle or bottle-like system or subsystem could be used in conjunction with or in lieu of bottle 100 according to one embodiment of the present disclosure.

In addition, FIGS. 1A-3B illustrate a relatively small bottle 100 (e.g., 375 mL bottle), and FIGS. 4A-6B similarly illustrate a relatively medium-sized bottle 400 (e.g., 550 mL bottle) having similar characteristics to bottle 100. Likewise, FIGS. 7A-9B illustrate a relatively large-sized bottle 700 (e.g., 1000 mL bottle) having similar characteristics to bottle 100. It should be understood that bottles 100, 400, and 700 shown in FIGS. 1A-3B, 4A-6B, and 7A-9B, respectively, are for illustrative purposes only and that any other bottle or bottle-like system or subsystem, regardless of volume capacity, could be used in conjunction with or in lieu of bottles 100, 400, and 700 according to one embodiment of the present disclosure.

Figure 10C:
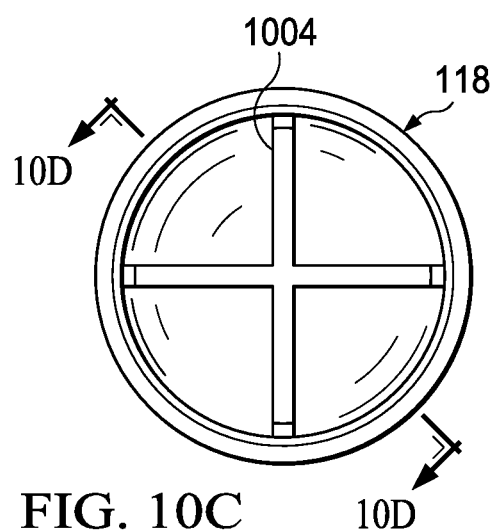
FIG. 10C is a somewhat simplified top plan view of the filter system shown in FIG. 10A according to one embodiment of the present disclosure.
Figure 10D:
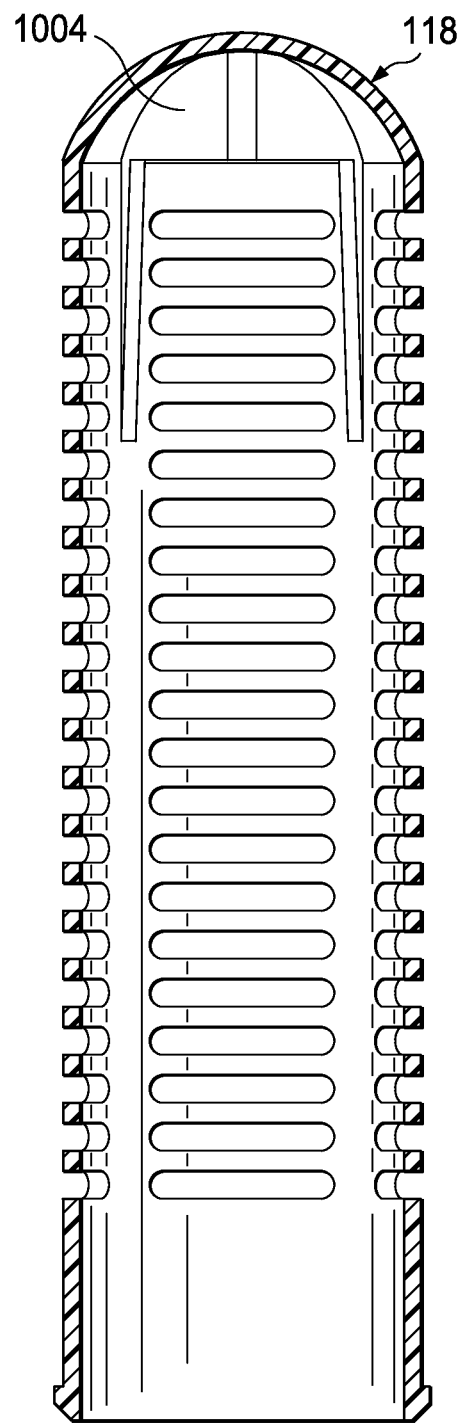
FIG. 10D is a somewhat simplified view along section 10D-10D of the filter system shown in FIG. 10C according to one embodiment of the present disclosure.
Figure 10E:
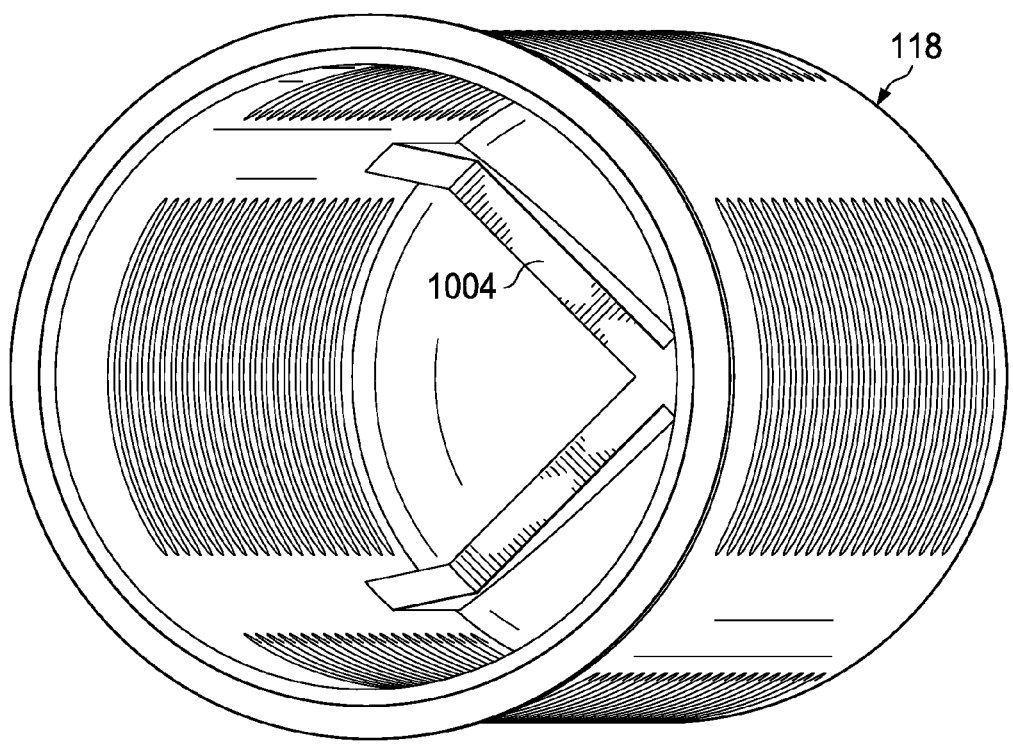
FIG. 10E is a somewhat simplified perspective view of the filter system shown in FIG. 10A according to one embodiment of the present disclosure.

FIG. 10A is a somewhat simplified side plan view of a filter system 118 for use with bottles 100, 400, and 700 according to one embodiment of the present disclosure, while FIG. 10B is a somewhat simplified view along section 10B-10B of filter system 118. FIG. 10C is a somewhat simplified top plan view of the filter system shown in FIG. 10A according to one embodiment of the present disclosure, while FIG. 10D is a somewhat simplified view along section 10D-10D of the filter system shown in FIG. 10C. Additionally, FIG. 10E is a somewhat simplified perspective view of the filter system shown in FIG. 10A according to one embodiment of the present disclosure. It should be understood that filter system 118 shown in FIGS. 10A-E is for illustrative purposes only and that any other filter or filter-like system or subsystem could be used in conjunction with or in lieu of filter system 118 according to one embodiment of the present disclosure.

Figure 11A:
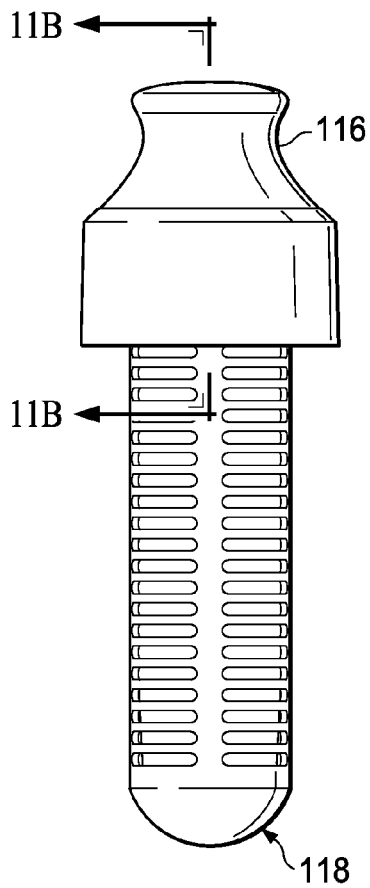
FIG. 11A is a somewhat simplified plan view of a filter system and discharge mechanism assembly according to one embodiment of the present disclosure.
Figure 11B:
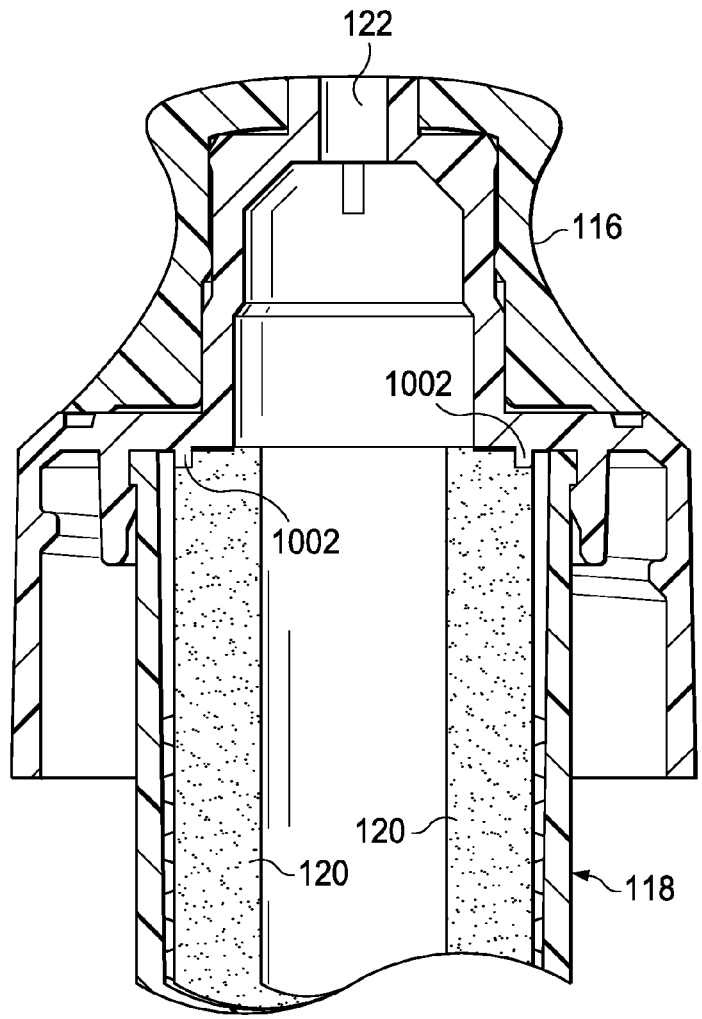
FIG. 11B is a somewhat simplified view along section 11B-11B of the filter system and discharge mechanism shown in FIG. 11A.

FIG. 11A is a somewhat simplified plan view of a filter system 118 and discharge mechanism 116 assembly according to one embodiment of the present disclosure, while FIG. 11B is a somewhat simplified view along section 11B-11B of the filter system and discharge mechanism assembly shown in FIG. 11A. It should be understood that the filter system 118 and discharge mechanism 116 assembly shown in FIGS. 11A and 11B are for illustrative purposes only and that any other filter or filter-like system or subsystem, or discharge mechanism system or subsystem could be used in conjunction with or in lieu of filter system 118 or discharge mechanism 116 according to one embodiment of the present disclosure.

Although bottles 100, 400, and 700 are generally illustrated having a somewhat contoured hourglass-like shape and a relatively smooth exterior surface, it should be understood that bottles 100, 400, and 700 could include any suitable size, shape, configuration, structure, accessory, or other various features according to one embodiment of the present disclosure.

In one embodiment, bottles 100, 400, and 700 could include elongated body 102 having a concave portion (or "waist") 104, cap 106, neck 108, opening 110, screw top 111, bottom 112, gate vestige 114, discharge mechanism 116, filter system 118, filter media 120, and discharge tube 122 as generally shown in FIGS. 1A-9B.

Bottles 100, 400, and 700 and their individual components could be made of any suitable material including, for example, polyethylene terephthalate (PET or PETE), high density polyethylene (HDPE), low density polyethylene (LDPE), thermoplastic polymer, polypropylene, oriented polypropylene, polyurethane, polyvinyl chloride (PVC), polytetrafluoroethylene (PTFE), polyester, high-gloss polyester, metal, synthetic rubber, natural rubber, silicone, nylon, polymer, antibacterial or antimicrobial materials, insulating, thermal, other suitable sustainable or biodegradable materials, or any combination thereof according to one embodiment of the present disclosure.

In one embodiment, bottle 100 could be made of about 28.0 g±2.0 g PETE, bottle 400 could be made of about 37.0 g±2.0 g PETE, and bottle 700 could be made of about 47.0 g±2.0 g PETE. In still other embodiments, bottle 100 could be made of about 18.0 g±2.0 g oriented polypropylene, bottle 400 could be made of about 24.0 g±2.0 g oriented polypropylene, and bottle 700 could be made of about 31.0 g±2.0 g oriented polypropylene.

In one embodiment, bottles 100, 400, and 700 could be manufactured according to certain specifications (e.g., wall thickness or weight of material) to achieve desired performance criteria. As an example, the relative dimensions of bottles 100, 400, and 700 could be customized to achieve certain desirable physical or performance characteristics such as, for example, bottle stiffness, recovery strength, flow rate, discharge rate, material distribution, side load rigidity, waist diameter, waist to base diameter ratio, waist to outer diameter ratio, angle of transition of the shoulder, filter specifications, bottle volume limits, material integrity, material sustainability, antibacterial or antimicrobial specifications, other suitable "bounce back" or environmental related thresholds, or any combination thereof.

In one embodiment, bottle 100 could generally include a height of about 6.00 inches, an outer diameter of about 2.81 inches, and a waist to outer diameter ratio of about 80.0%±5.0%. Similarly, in one embodiment, bottle 400 could generally include a height of about 7.34 inches, an outer diameter of about 3.01 inches, and a waist to outer diameter ratio of about 80.0%±5.0%. Likewise, in one embodiment, bottle 700 could generally include a height of about 9.26 inches, an outer diameter of about 3.48 inches, and a waist to outer diameter ratio of about 80.0%±5.0%.

In one embodiment, the wall of elongated body 102 could be made of PET and include a thickness in the range of about 0.018-0.028 inches to achieve material usage efficiency and a reduction in environmental effects. With this range of wall thickness, bottles 100, 400, and 700 generally exhibit favorable elasticity properties after being squeezed. Bottles 100, 400, and 700 thus retain their shape and structural integrity even after repeated use unlike conventional disposable water bottles, which typically have a wall thickness of about 0.008-0.012 inches. In a more specific embodiment, the wall thickness of bottles 100, 400, and 700 could include a thickness of about 0.023 inches. It should be understood that bottles 100, 400, and 700 could be manufactured with thicker (or thinner) walls to provide sufficient recovery force for the "bounce back" or breathing cycle allowing bottles 100, 400, and 700 to return to their original shape according to one embodiment of the present disclosure.

In one embodiment, elongated body 102 and other parts of bottles 100, 400, and 700 could include a blow-molded plastic structure manufactured using, for example, a generally two-step process according to one embodiment of the present disclosure. The two-step process could include making an appropriate "pre-form" structure using an injection molding technique and then creating the final bottle shape (including, for example, concave portion 104, neck 108, opening 110, bottom 112, and gate vestige 114) using a "reheat and stretch" blow molding technique. In one embodiment, the plastic or other material used to make elongated body 102 is heated in an extruder, which extrudes a tubular stream of plastic forming the general structure for bottles 100, 400, and 700.

In one example, a container mold, corresponding to the shape of bottles 100, 400, or 700, closes around the outer part of the tubular stream of plastic. Compressed air could be inserted near the top of the mold to blow pressure into the mold, creating pressure which pushes the tubular plastic stream outward along the contour of the inside of the mold. In this manner, the plastic stream is shaped and cooled to produce the desired plastic container for bottles 100, 400, or 700. In addition, elongated body 102 could include a smooth exterior surface to allow adhesive labels to adhere sufficiently or printing/etching on the exterior surface of bottles 100, 400, and 700.

In one embodiment, elongated body 102 could aid in handling bottles 100, 400, and 700. For example, concave portion 104 could be relatively easily squeezed by hand to facilitate the flow of liquid out of bottles 100, 400, and 700. Elongated body 102 could exhibit a favorable rate of deformation and return to its original shape (i.e., "breathability") after one uses bottles 100, 400, and 700. As an example, if one were to squeeze bottle 100 (e.g., generally in the area including concave portion 104) to facilitate the flow of liquid to an opening of bottle 100 via discharge tube 122, bottle 100 could exhibit sufficient rigidity and elasticity to return air into bottle 100. Accordingly, bottle 100 could return to its original shape (or "bounce back") at a suitable rate without experiencing permanent deformation or denting to any surface of bottle 100 or bottle 100 in general.

Similarly, if bottle 100 were fitted with bottle mountable filter system 118 as shown in FIG. 2A, for example, and one were to squeeze bottle 100 to facilitate the flow of liquid from bottle 100 through filter 118 and discharge tube 122, bottle 100 could exhibit sufficient rigidity and elasticity to return air into bottle 100 and thus restore bottle 100 to its original shape (or "bounce back"). This "bounce back" behavior could occur at a suitable rate without any permanent deformation or denting to any surface of bottle 100 or bottle 100 in general. In addition, bottle 100 could be squeezed using a reasonable threshold (i.e., not excessively hard) to achieve sufficient flow rates of the liquid discharging from bottle 100. In one embodiment, liquid could be discharged by proactively inhaling air from and sucking on discharge mechanism 116 and facilitating a sufficient flow of water out of bottle 100. In another embodiment, liquid could be discharged from bottle 100 by simultaneously squeezing bottle 100 using a reasonable threshold and inhaling air from and sucking on discharge mechanism 116.

The ratio between the smallest outside diameter of concave portion 104 to the largest outside diameter of body 102 can be controlled to yield favorable aesthetic and structural characteristics according to one embodiment of the present disclosure. If, for example, bottle 100 included a ratio significantly smaller than the preferred ratio, it may be difficult to achieve proper distribution of material during the blow molding process and bottle 100 (and, in particular, its sidewalls) may be subject to kinking and permanent distortion when squeezed. If, for example, bottle 100 included a ratio significantly larger than the preferred ratio, the aesthetically desired hourglass shape of bottle 100 may be difficult to achieve.

In one embodiment, the ratio between the major outer diameters of bottles 100, 400, and 700 and their respective concave portions 104 (i.e., the waist) could be about 80.0%±5.0%. In other words, in one example, if the outside diameter of bottle 100 is about 2.81 inches, then the smallest outside diameter of concave portion 104 could be about 2.22 inches±0.140 inches. Similarly, if the outside diameter of bottle 400 is about 3.01 inches, then the smallest outside diameter of concave portion 104 could be about 2.41 inches±0.150 inches. Likewise, if the outside diameter of bottle 700 is about 3.48 inches, then the smallest outside diameter of concave portion 104 could be about 2.79 inches±0.174 inches.

Cap 106, neck 108, opening 110, bottom 112, gate vestige 114, and discharge mechanism 116 generally shown in FIGS. 1A-9B could include any suitable size, shape, configuration, structure, accessory, or other various features according to one embodiment of the present disclosure. In one example, cap 106, neck 108, opening 110, bottom 112, gate vestige 114, and/or discharge mechanism 116 could be coated with or treated with antibacterial or antimicrobial materials to reduce contamination of the water stored in or dispersed by bottles 100, 400, and 700.

In one embodiment, cap 106 could be coupled with neck 108, opening 110, and/or discharge mechanism 116 to provide a cover for bottles 100, 400, and 700. Neck 108 is generally disposed between one end of body 102 and opening 110. In one embodiment, neck 108 could generally include an inner diameter of about 1.040 inches and any reasonable range of tolerances. The angle of transition of the shoulder (i.e., the angle between: (a) a tangent to body 102 at an intersection between body 102 and neck 108; and (b) a line perpendicular to a vertical axis of body 102) could be controlled to aid in distribution of material during the blow molding process to make bottles 100, 400, and 700. Although the transition angle could be in the range of about 20.0-45.0 degrees, in one embodiment, the transition angle could be about 30.0 degrees and could include any reasonable range of tolerances.

In one embodiment, opening 110 could generally include an inner diameter of about 1.040 inches and include any reasonable range of tolerances. In one embodiment, gate vestige 114 could be disposed along bottom 112 and could generally provide bottles 100, 400, and 700 additional burst strength or resistance. Discharge mechanism 116 could be coupled to neck 108 and opening 110 and provide an outlet for dispersing filtered water to the user according to one embodiment of the present disclosure.

Screw top 111 could include any suitable structure to retain or otherwise couple discharge mechanism 116 to neck 108 according to one embodiment of the present disclosure. In one embodiment, screw top 111 could include a clockwise oriented thread or a counter-clockwise oriented thread. It should be understood, however, that any suitable mechanism of coupling discharge mechanism 116 to neck 108 could be used according to one embodiment of the present disclosure including, for example, a compression coupling, magnetic coupling, a coupling sleeve, any other suitable coupling mechanism, or any combination thereof.

Filter system 118 is generally coupled with and fluidly connects bottles 100, 400, and 700 containing liquids to discharge mechanism 116 according to one embodiment of the present disclosure. Filter system 118 could be reused, retrofitted, or replaced as needed or desired. Filter system 118 could include a filter housing having a height of about 3.407 inches and an outer diameter of about 0.911 inches, and a slotted filtering area with a height of about 3.092 inches according to one embodiment of the present disclosure.

In one embodiment, the surface area of filter system 118 available to the contents of bottles 100, 400, and 700 could affect the filtering capability of bottles 100, 400, and 700. Filter system 118 could include an outside surface area (including the outside diameter and the bottom of filter system 118) of about 7.44 square inches and an open area (having slots in the housing of filter system) of about 2.50 square inches according to one embodiment of the present disclosure.

Filter system 118 could include any suitable filter media 120 including, for example, a carbon, active carbon, charcoal, reverse osmosis, distiller, backwash, other suitable filter, or any combination thereof. In one embodiment, filter media 120 could include one or more carbon cartridges having, for example, a height of about 3.10 inches and a diameter of about 0.730 inches. Both the height and diameter of filter media 120 could include any reasonable range of tolerance. It has been observed, however, that the range of tolerances for filter media 120 could be as much as ⅛ of an inch or more. In one embodiment, however, the diameter of filter media 120 could include a tolerance of about ±0.010 inches while the length of filter media 120 could include a tolerance of about ±0.015 inches.

In one embodiment, filter media 120 could have a water flow rate within a certain range to achieve desired performance criteria. Once water is discharged through filter system 118 and discharge mechanism 116, the air returning into bottle must pass through this same filter media 120. Accordingly, the return airflow could essentially provide cleansing or backwashing function that prolongs the usable life of filter system 118 according to one embodiment of the present disclosure. Similarly, any residual liquid remaining in discharge mechanism 116 may return into a corresponding bottle through filter media 120 and provide a cleansing or backwashing function.

According to one embodiment of the present disclosure, filter media 120 could be secured or otherwise disposed within the filter housing of filter system 118 by supporting structures associated with filter system 118 and discharge mechanism 116. For example, a proximate end of filter media 120 could be supported by one or more support structures 1002 disposed along a bottom surface of discharge mechanism 116, while a distal end of filter media 120 could be supported by one or more secondary support structures 1004 disposed along an interior surface of the housing of filter system 118 as generally shown in FIGS. 10A-10E, 11A, and 11B.

In one embodiment, support structure 1002 could be a generally annular structure disposed along a bottom surface of discharge mechanism 116 and include a length sufficient enough to cut into a proximate end of filter media 120 as generally shown in FIG. 11B. Secondary support structure 1004, on the other hand, could be a generally cross-bar like structure disposed along an interior bottom surface of the housing of filter system 118 as generally shown in FIGS. 10C, 10D, and 10E. Secondary support structure 1004 could be configured to cut into a distal end of filter media 120 without crushing filter media 120 when filter media 120 is in a fully engaged position within the housing of filter system 118. Since both support structure 1002 and secondary support structure 1004 cut into opposite ends of filter media, the housing of filter system 118 can accommodate filter media 120 of varying lengths while still applying compression force along the length of filter media 120.

It should be understood that support structure 1002 and secondary support structure 1004 could accommodate tolerance differences in size, shape, or configuration of filter media 120. Accordingly, support structure 1002 and secondary support structure 1004 could ensure a sufficient compression fit and seal of filter media 120 within filter system 118 and thus eliminate, for example, any "bypass flow" (i.e., water that might leak past filter system 118) and prevent consumption of unfiltered water. For example, secondary support structure 1004 may apply axial pressure to filter media 120 sufficient to force filter media 120 against support structure 1002, thus creating a seal between filter media 120 and support structure 1002.

In one embodiment, the distal end of filter media 120 could be compressed against a bottom surface of filter housing 118 by secondary support structure 1004. The proximate end of filter media 120 could be compressed against discharge mechanism 116 and in particular support structure 1002 according to one embodiment of the present disclosure. In one embodiment, when filter media 120 is in a fully engaged position, secondary support structure 1004 could aid in accommodating any deviations in tolerance in the overall length or shape of filter media 120 and ensure an adequate seal between filter media 120 and filter system 118. Even if some of filter media 120 are too short and do not fully engage with secondary support structure 1004, the proximate end of filter media 120 still provides an adequate seal with support structure 1002 according to one embodiment of the present disclosure.

It should be understood that support structure 1002 and secondary support structure 1004 could include any suitably sized, shaped, or configured support structure to secure or otherwise aid in disposing filter media 120 within the housing of filter system 118. For example, support structure 1002 and secondary support structure 1004 could include an annular structure, tapered structure, ridged structure, ribbed structure, cross-barred structure, protrusion, compression structure, cut-in structure, other suitable structure, or any combination thereof.

Discharge tube 122 could fluidly connect filter system 118 to discharge mechanism 116 and insure that any water discharged from bottles 100, 400, and 700 passes through filter system 118 according to one embodiment of the present disclosure. In one embodiment, discharge tube 122 could thus further eliminate any "bypass flow" (i.e., water that might leak past filter system 118) and prevent consumption of unfiltered water.

Accordingly, by matching the properties of the blow molded bottles 100, 400, and 700 to the properties of the filter system 118, bottles 100, 400, and 700 could generally provide a fully functioning filtered water bottle "system" with the necessary degree of filtration and an improved user experience according to one embodiment of the present disclosure.

Figure 12:
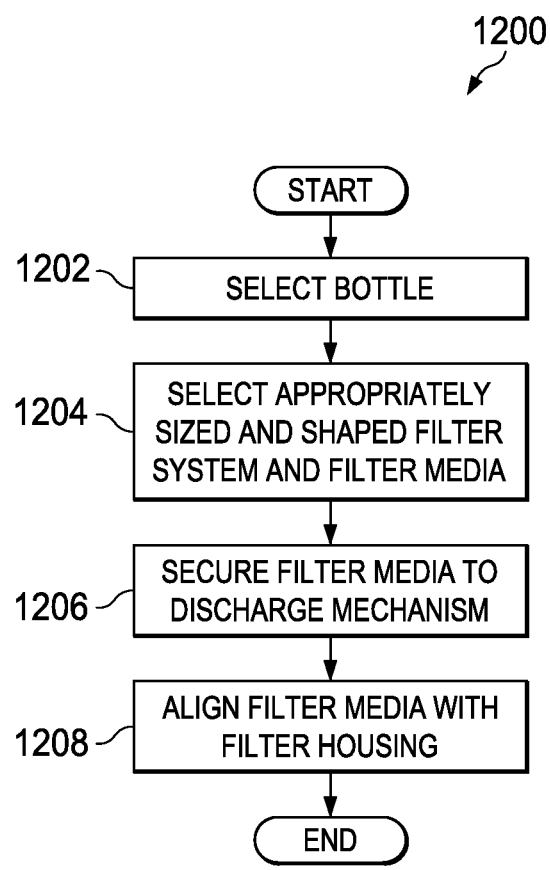
FIG. 12 is a somewhat simplified flow diagram illustrating a method of disposing filter media within a filter cartridge according to one embodiment of the present disclosure.

FIG. 12 is a somewhat simplified flow diagram illustrating method 1200 of producing filter system 118 shown in FIG. 11A according to one embodiment of the present disclosure. It should be understood that method 1200 shown in FIG. 12 is for illustrative purposes only and that any other suitable method or sub-method could be used in conjunction with or in lieu of method 1200 according to one embodiment of the present disclosure. It should also be understood that the steps described in conjunction with method 1200 could be performed in any suitable order.

Method 1200 could include installing a filter media such as, for example, filter media 120 described above, to use in filter system 118 according to one embodiment of the present disclosure. In step 1202, method 1200 could include selecting an appropriate bottle to store, hold, or otherwise retain unfiltered water or other liquid according to one embodiment of the present disclosure. It should be understood that the selected bottle could include, for example, bottles 100, 400, and 700, or could include any suitable size, shape, configuration, structure, accessory, or other various features according to one embodiment of the present disclosure. In step 1204, method 1200 could include selecting the appropriate size and dimensions for a bottle mountable filter system such as, for example, filter system 118 and filter media 120 according to one embodiment of the present disclosure.

In step 1206, method 1200 could include disposing or otherwise securing filter media 120 to a discharge mechanism such as, for example, discharge mechanism 116 according to one embodiment of the present disclosure. In step 1208, method 1200 could include disposing and aligning discharge mechanism 116 and filter media 120 with the filter housing according to one embodiment of the present disclosure. In some cases, filter media 120 will be crushed against support structures located internally within the housing. For example, filter media 120 could ensure a sufficient compression fit between support structure 1002 and secondary support structure 1004 and thus prevent consumption of unfiltered water. In one embodiment, a proximate end of filter media 120 could be supported by one or more support structures 1002 disposed along a bottom surface of discharge mechanism 116, while a distal end of filter media 120 could be supported by one or more secondary support structures 1004 disposed along an interior surface of the housing of filter system 118 as generally shown in FIGS. 10A-10E, 11A, and 11B.

The present disclosure generally provides a relatively inexpensive filtration system for disposable bottles or, alternatively, reusable bottles for transporting water or other liquids to thus provide an environmentally friendly option to conventional bottled water systems. In one embodiment, the present disclosure could include a support system to adequately secure the filter media within a filter housing while ensuring a sufficient compression fit and seal of filter media within filter system to eliminate water leaking past filter system and prevent consumption of unfiltered water.

It may be advantageous to set forth definitions of certain words and phrases used in this patent document. The terms "water" and "beverage" are generally used herein to refer to water and any other thirst-quenching liquids, such as soft drinks, sports drinks, and the like. A water bottle, canister, or other container may be commonly referred to as a "bottle."

In addition, the term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A bottle filter system comprising:
   a filter media having a first end disposed along a proximate end of a filter housing and a second end disposed along a distal end of the filter housing;
   a support structure disposed along an interior surface of the proximate end of the filter housing, wherein the support structure compresses the first end of the filter media to prevent water housed in a bottle from bypassing a compression seal between the support structure and the filter media; and
   a secondary support structure disposed along an interior surface of the distal end of the filter housing and configured to cut into a second end of the filter media when the filter media is in an engaged position within the filter housing, an wherein said secondary support structure compresses the first end of the filter media against the proximate end of the filter housing.

2. The bottle filter system of claim 1, wherein the filter housing is removably mounted within the bottle.

3. The bottle filter system of claim 1, wherein the secondary support structure comprises a generally crossbar-like structure.

4. The bottle filter system of claim 1, wherein the secondary support structure compresses the second end of the filter media to support the filter media.

5. The bottle filter system of claim 1, wherein the support structure comprises a generally annular shape.

6. The bottle filter system of claim 1, wherein the support structure is further disposed along a bottom surface of a discharge mechanism of the bottle.

7. The bottle filter system of claim 1, wherein the support structure compresses the first end of the filter media to provide a substantially watertight seal between the support structure and the filter media.

8. The bottle fitter system of claim 1, wherein the filter media comprises a carbon filter.

9. The bottle filter system of claim 1, wherein a length of the filter media comprises a tolerance of about ±0.015 inches.

10. The bottle filter system of claim 1, further comprising:
    a filter housing removably mounted within the bottle and having a proximate end and a distal end, wherein the support structure is further configured to cut into the first end of the filter media when the filter media is in an engaged position within the filter housing.

11. The bottle filter system of claim 10, wherein the secondary support structure comprises a generally crossbar-like structure.

12. A bottle filter system comprising:
    a filter housing removably mounted within a bottle and having a proximate end and a distal end;
    a carbon-based filter media comprising a first end and a second end, wherein the first end is disposed along the proximate end of the filter housing and the second end is disposed along the distal end of the filter housing;
    an annular support structure disposed along an interior surface of the proximate end of the filter housing and further disposed along a bottom surface of a discharge mechanism of the bottle, wherein the support structure is configured to cut into and compress the first end of the filter media when the filter media is in an engaged position within the filter housing; and a crossbar-like secondary support structure disposed along an interior surface of the distal end of the filter housing, the secondary support structure configured to cut into the second end of the filter media when the filter media is in an engaged position within the filter housing, and wherein the secondary support structure compresses the first end of the filter media against the proximate end of the filter housing.

13. The bottle filter system of claim 12, wherein the support structure compresses the first end of the filter media to provide a substantially watertight seal between the support structure and the filter media.

14. The bottle filter system of claim 12, wherein a length of the filter media comprises a tolerance of about ±0.015 inches.

15. The bottle filter system of claim 2, wherein the bottle comprises a squeezable beverage bottle comprising: an elongate body having a concave waist portion; wherein a ratio of the smallest outer diameter of the concave waist portion to the largest outer diameter of the elongate body is about 80.0%±5.0%.

16. The bottle filter system of claim 15, wherein a wall thickness of the elongate body ranges from about 0.018 inches to about 0.028 inches.

17. The bottle filter system of claim 15, wherein the elongate body is formed from polyethylene terephthalate (PETE).

18. The bottle filter system of claim 15, wherein the elongate body is formed from oriented polypropylene.

19. A squeezable beverage bottle comprising:
an elongate body comprising:
an upper portion, a concave waist portion, and a lower portion along a height of the elongate body; and
a neck portion coupled to the upper portion and forming an opening to an interior of the elongate body;
a discharge mechanism coupled to the neck portion of the elongate body;
a filter system coupled to the discharge mechanism and extending through the opening into the interior of the elongate body; and
a discharge port extending through the discharge mechanism and the filter system in fluid communication with the interior of the elongate body, wherein the filter system includes:
a filter media having a first end disposed along a proximate end of a filter housing and a second end disposed along a distal end of the filter housing;
a support structure disposed along an interior surface of the proximate end of the filter housing, wherein the support structure compresses the first end of the filter media to prevent water housed in a bottle from bypassing a compression seal between the support structure and the filter media; and
a secondary support structure disposed along an interior surface of the distal end of the filter housing and configured to cut into a second end of the filter media when the filter media is in an engaged position within the filter housing, and wherein the secondary support structure compresses the first end of the filter media against the proximate end of the filter housing.

20. The squeezable beverage bottle of claim 19, wherein a ratio of the smallest outer diameter of the concave waist portion to the largest outer diameter of at least one of the upper portion and the lower portion is about 80.0%±5.0%.

* * * * *